May 23, 1961 G. E. KELLY 2,985,849
CRYSTAL OSCILLATOR WITH REACTANCE TUBE CONTROL USED IN COLOR TELEVISION RECEIVING APPARATUS
Filed March 18, 1953
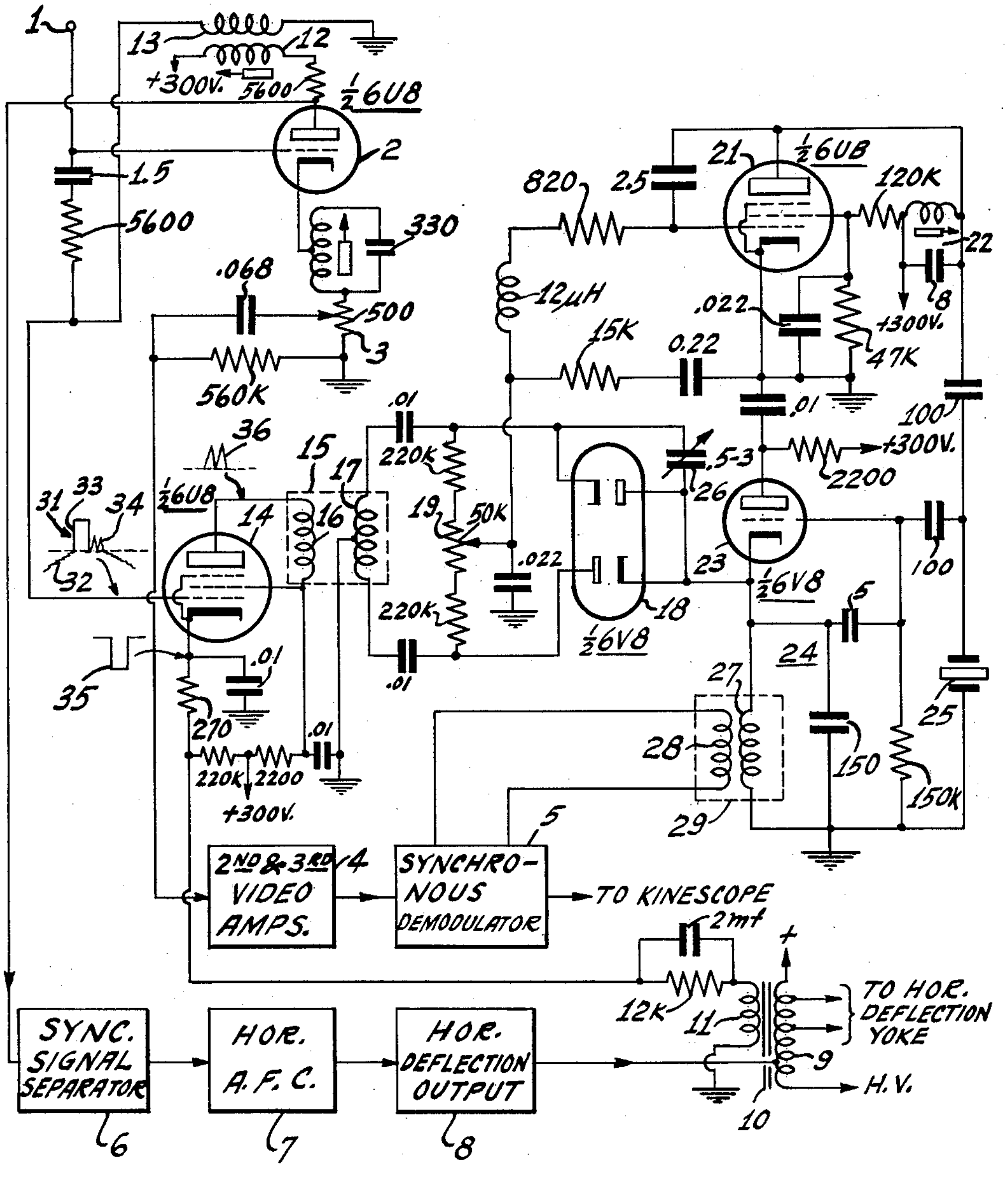
INVENTOR.
Gordon E. Kelly
BY W. H. Sprague
ATTORNEY United States Patent Office 2,985,849

Patented May 23, 1961

2,985,849

CRYSTAL OSCILLATOR WITH REACTANCE TUBE CONTROL USED IN COLOR TELEVISION RECEIVING APPARATUS

Gordon E. Kelly, Haddonfield, N.J., assignor to Radio Corporation of America, a corporation of Delaware Filed Mar. 18, 1953, Ser. No. 343,060

6 Claims. (Cl. 332—26)

This invention relates to automatic frequency control systems and has particular reference to apparatus for maintaining synchronous operation of a color subcarrier wave oscillator in a color television signal receiver.

In the type of color television system which presently is in accordance with standards proposed by the National Television Systems Committee (NTSC), the side bands of a subcarrier wave, which is both phase- and amplitude-modulated in accordance with the color information of a subject, are interspersed with the video signals representing brightness of the subject. By properly choosing the frequency of the color subcarrier wave, the color signal modulated side band energy components may be made to fall between the brightness signal energy components.

In such systems, the color information is derived at a receiver by synchronously demodulating the color subcarrier wave. Such demodulation is effected under the control of a reference frequency oscillator operating in synchronism and in phase with the received phase- and amplitude-modulated color subcarrier wave.

For the synchronization of the receiver color subcarrier wave reference frequency oscillator, it is the present practice to transmit a composite signal which includes, in addition to the video signals comprising brightness and color information, the usual horizontal and vertical synchronizing signals and also bursts of several cycles each of the color subcarrier wave frequency respectively following the horizontal synchronizing signals. Such a color synchronizing system is described in a publication titled "Recent Developments in Color Synchronization in the RCA Color Television System" issued by the Radio Corporation of America, February 1950. Such a system also is described in U.S. Patent 2,594,380, issued April 29, 1952, to L. E. Barton and P. H. Werenfels and titled "Synchronizing Apparatus for Color Signal Sampling Oscillators." The general burst type of color synchronizing system also forms the subject matter of a copending U.S. patent application of A. V. Bedford, Serial No. 143,800, filed February 11, 1950, and titled "Synchronizing Apparatus," now Patent No. 2,728,812, granted December 27, 1955.

At a receiver operating in accordance with the burst type of color synchronizing system, it is necessary to separate or recover the burst of color subcarrier wave frequency transmitted in the composite signal and to compare it in phase with the wave at substantially the same frequency derived from the local color reference frequency oscillator.

An object of the present invention, therefore, is to provide an improved automatic frequency control system for color television receivers in order to effect a simpler and more efficient synchronization of a receiver color subcarrier reference frequency oscillator by means of received bursts of the color subcarrier wave.

Another object of the invention is to provide an improved apparatus for separating the bursts of color subcarrier wave from a composite television signal and which provides a higher degree of noise immunity than apparatus heretofore employed.

Still another object of the invention is to provide an improved automatic frequency control system for an oscillator whereby the oscillator may be operated at only one frequency securely locked to the frequency of the synchronizing signals.

In accordance with the invention, the automatic frequency control system for a color television receiver includes a burst signal separator electron tube upon the grid circuit of which a composite signal, including bursts of the color subcarrier wave, is impressed. The tube is normally unresponsive to the composite signal and is periodically rendered conducting during substantially only the reception period of the subcarrier wave frequency bursts to produce in its anode circuit the subcarrier wave frequency bursts exclusively of the rest of the composite signal. The burst separator tube is rendered conducting periodically under the control of keying pulses which are produced in response to the horizontal synchronizing signal. The apparatus also includes an oscillator having a grid circuit tuned to substantially the subcarrier wave frequency and a cathode circuit tuned to a somewhat lower frequency. The cathode circuit of the oscillator tube is coupled to a phase detecting means which also is coupled to the anode circuit of the burst separator tube for the purpose of detecting phase deviations between the separated burst signals and oscillator reference frequency wave. A reactance tube which is responsive to any detected phase deviations is provided with an anode circuit which is tuned to a frequency lower than the subcarrier wave frequency and which is coupled to the oscillator tube grid circuit in order to maintain the frequency of the oscillator synchronous and cophasal with the received subcarrier wave bursts.

An additional feature of the present invention is a burst signal separator which has a relatively high immunity to noise. The composite signal is impressed upon the grid circuit of a burst separator tube by means of a resonant circuit which is tuned to the subcarrier wave frequency. The burst separator tube is rendered operative momentarily by means of keying pulses controlled by horizontal synchronizing signals. By such means, the subcarrier wave frequency bursts are produced in the anode circuit of the burst separator tube exclusively of the rest of the composite signal and also substantially exclusively of random noise.

Still another feature of the present invention is the provision of a cathode follower type of oscillator in an automatic frequency control system of such a character that the oscillator is constrained to operate exclusively at only one frequency. The grid circuit of the oscillator is tuned to the desired frequency and the cathode circuit is tuned to a somewhat lower frequency. The automatic frequency control system, in addition, includes a reactance having an anode circuit which is also tuned to a frequency lower than the desired frequency. The anode circuit of the reactance tube is coupled to the grid circuit of the oscillator tube, thereby maintaining the frequency of the oscillator substantially equal to the desired frequency under the control of the reactance tube.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single figure of the drawing is a circuit diagram, partly in block form, of an automatic frequency control system embodying the present invention and all features thereof.

With reference now to the drawing, the illustrative embodiment of the invention will be described. This description will not include reference to circuit details, which may be readily seen from the drawing. The values of the essential components are indicated and are in accordance substantially with a practical embodiment of the invention which has successfully operated. In indicating these values, all resistance values are in ohms, all capacitance values less than 1.0 are in microfarads and greater than 1.0 are in micromicrofarads, unless otherwise noted. Also in a conventional manner, K, used in the values of some of the resistors, equals 1000 ohms.

It will be assumed that there is impressed upon input terminal 1 a composite television signal derived from the second detector, for example, of a superheterodyne receiver. This composite television signal will be understood to include a video signal component including both brightness information and color information of a subject in the form of a phase- and amplitude modulated subcarrier wave having a nominal frequency equal substantially to one of the higher brightness component frequencies. The composite signal also will be understood to include the usual horizontal and vertical synchronizing signals for maintaining synchronous operation of the receiver deflection apparatus with that of the transmitter. In addition, the composite signal also will be understood to include a burst of several cycles of the color subcarrier wave frequency superimposed substantially on the back porch of the horizontal synchronizing signals.

The composite television signal appearing at the terminal 1 is impressed upon the grid circuit of a first video amplifier stage including an electron tube 2. The cathode circuit of this tube is connected to apparatus including a contrast control potentiometer 3 which is coupled in a somewhat conventional manner to subsequent video amplifier stages such as the second and third video amplifiers 4 indicated in the drawing. The video amplifiers 4 are coupled to apparatus such as a synchronous demodulator 5 for the recovery of the information which is phase- and amplitude modulated upon the color subcarrier wave. The output of this demodulator is coupled to the electron beam intensity controlling circuits of a kinescope as indicated. It will be understood that the kinescope controlling apparatus is energized by other signals such as the brightness signal in a manner not shown for the reason that it is no part of the present invention and is not necessary to an understanding of the invention.

The anode circuit of the composite signal amplifier 2 is coupled to a sync signal separator 6 for the separation from the composite signal of the horizontal and vertical synchronizing signals in a conventional manner. The horizontal synchronizing signals are impressed upon a horizontal automatic frequency control (AFC) apparatus 7 which will be understood to include a horizontal deflection oscillator which is maintained in synchronous operation with the received horizontal sync signals in the usual manner. The output of the horizontal AFC apparatus 7 is coupled to a horizontal deflection output circuit 8 which may, as usual, include a power amplifier stage, the output of which is coupled to the primary winding 9 of a horizontal deflection output transformer 10. The primary winding 9 of the horizontal deflection output transformer may be coupled to the horizontal deflection yoke winding and to a high voltage rectifier circuit substantially as indicated in a conventional manner. The transformer 10 also has a secondary winding 11 in which to develop keying pulses in response to horizontal retrace or flyback. The use of these keying pulses will be described subsequently.

The anode circuit of the first video amplifier tube 2 includes a coupling transformer having a primary winding 12 and a secondary winding 13. These two windings are tightly coupled. The secondary winding is connected to the control grid circuit of a burst separator electron tube 14. The winding 13 is tuned by means of the input circuit capacitance of the tube 14 and distributed capacitance for resonance substantially at the subcarrier wave frequency. By such means, the input grid circuit of the burst separator tube is prevented from charging up on synchronizing signal information having a narrow pass band of approximately .5 mc. bandwidth centering about the subcarrier wave frequency.

The anode circuit of the burst separator tube 14 includes a bi-filar burst signal output coupling transformer 15, the primary winding 16 of which is connected as part of the load circuit for the burst separator tube and the secondary winding 17 of which is tapped at an intermediate point which is effectively grounded, as indicated. The secondary winding 17 of the burst output transformer 15 is coupled to the double diode phase detector electron tube 18. By means of the described secondary winding 17 of the coupling transformer 15, the phase detector is driven in a push-pull manner which cancels any undesirable second harmonics which may be developed due to clipping of the separated burst of subcarrier wave frequency.

The output circuit of the phase detector which is derived from a balancing potentiometer 19 is coupled to the input grid circuit of a reactance tube 21 so as to control the operation of the reactance tube in accordance with any detected phase deviations. The anode circuit of the reactance tube includes a parallel resonant circuit 22 which is tuned at a frequency which is somewhat lower than the frequency of the color subcarrier wave.

The apparatus also includes an oscillator tube 23 which is operated as a cathode follower having a parallel resonant circuit 24 connected as part of its cathode circuit and tuned at a frequency which is lower than the subcarrier wave frequency. Preferably, the frequency at which the cathode tuned circuit 24 is resonant is between the frequency of the color subcarrier wave and the frequency at which the resonant circuit 22 in the reactance tube anode circuit is tuned. The grid circuit of the oscillator tube 23 also is tuned by means including a piezoelectric crystal 25. The tuning of this circuit is substantially to the frequency of the color subcarrier wave. The anode circuit of the reactance tube 21 is coupled to the grid circuit of the oscillator tube 23 so as to control the frequency of the oscillator in accordance with the operative condition of the reactance tube.

The subcarrier wave frequency is derived from the oscillator tube from the cathode circuit which, as indicated, is connected to the double diode 18 of the phase detector. The variable capacitor 26 is employed to neutralize any coupling between the burst output transformer 15 and the coil 27 of the oscillator cathode tuned circuit 24. The capacitor 26 performs the desired neutralization by equalizing the shunt capacitances of the diode 18. Any coupling between the burst transformer 15 and the oscillator coil 27 appears as an error voltage in the output circuit of the phase detector when weak signals are encountered, thereby tending to reduce the operative effectiveness of the AFC system.

The output of the oscillator 23 also is impressed upon the synchronous demodulator 5 by means of a coil or winding 28 coupled to the oscillator coil 27 and together with which to comprise a subcarrier wave output transformer 29. It will be understood that the arrangement of the subcarrier wave output transformer relative to the synchronous demodulator 5 is entirely diagrammatic and is not intended to indicate the details of such a coupling. In accordance with the conventional practice in the operation of receivers of this type, different phases of the reference wave are impressed upon different sections of the synchronous demodulator for the purpose of separately deriving the different color representative signals. Details of this character form no part of the present invention and are not required for an understanding thereof and accordingly are omitted in the interest of clarity.

In the operation of the described apparatus embodying an automatic frequency control system in accordance with the invention, a composite television signal 31 is impressed upon the control grid circuit of the burst separator tube 14. This composite signal includes a video component 32, a horizontal synchronizing signal 33 and a burst signal 34 of several cycles of a color subcarrier wave superimposed substantially on the back porch of the horizontal synchronizing signal. Keying pulses 35 of negative polarity derived from the secondary winding 11 on the horizontal deflection output transformer 10 are impressed upon the cathode circuit of the burst separator tube 14 in suitable time relationship to the composite signal 31 to render the tube 14 operative substantially only during the interval that the burst signal 34 is impressed upon the grid circuit of the tube. Accordingly, the separated burst signal 36 is developed in the anode circuit of the burst separator tube 14. It will be understood that the burst signal 36, as well as the received burst signal 34, is of substantially sinusoidal wave form. Also, it will be understood that the subcarrier reference frequency wave produced by the oscillator tube 23 is of substantially sinusoidal form.

Deviations in the phase of the separated burst signal 36 and the subcarrier reference frequency wave produced by the oscillator tube 23 and detected by the apparatus including the double diode 18 produces substantially unidirectional voltages in the output potentiometer 19 varying in polarity in accordance with the sense of the phase deviation and in amplitude in accordance with the magnitude of the phase deviation. These substantially unidirectional voltages control the operation of the reactance tube 21 in a conventional manner. The reactance tube, in turn, controls the frequency of the oscillator including the tube 23 so as to make it conform with the frequency and phase of the received subcarrier wave frequency burst signal 34.

In using an automatic frequency control system in accordance with this invention, it has been found that, in order to produce the proper feedback of energy in a cathode follower type of oscillator, the cathode circuit should have a capacitive type of impedance at the desired oscillator frequency. In other words, the cathode resonant circuit 24 should be tuned below the anti-resonance frequency of the crystal 25 substantially as described. As a practical consideration, however, in order to minimize the production of harmonics in the subcarrier reference frequency wave derived from the oscillator, the cathode resonant circuit 24 is tuned so that it is only slightly less in frequency than the anti-resonance frequency of the crystal 25. In such a case, the resonant circuit 24 in the cathode circuit of the oscillator tube is tuned to a frequency which is between the anti-resonance frequency of the crystal, which is the desired subcarrier wave reference frequency, and the frequency to which the resonant circuit 22 in the anode circuit of the reactance tube 21 is tuned.

It is seen that an automatic frequency control system including the various features thereof in accordance with the present invention provides a simpler and more efficient system of this character than those heretofore employed for use in color television receivers. Such a system also provides a substantially greater immunity to noise for a burst signal separator. In addition, the use of a cathode follower type of oscillator in the manner disclosed in accordance with this invention makes it virtually impossible for the oscillator to lock in synchronous oscillation at any frequency other than the desired one.

The improved type of burst signal separator in accordance with this invention has the advantage of maintaining substantially uniform amplitude of the separated bursts regardless of noise conditions encountered. Furthermore, the keying of the cathode circuit of the burst signal separator by means of a negative pulse derived from the horizontal deflection output circuit prevents the grid of the burst signal separator tube from charging up on noise pulses at times other than those in which the burst signal is received.

The described coupling between the first video, or composite signal, amplifier and the burst signal separator tube, including the tightly coupled transformer coils 12 and 13, the secondary of which is tuned with the input capacitance of the burst separator tube has the advantage of eliminating the charging up of the burst signal separator grid circuit on any synchronizing signal information having frequencies lying within a narrow pass band centered around the color subcarrier wave frequency. Another advantage of this type of burst signal separator derived from the use of the bi-filar transformer having a tapped secondary winding and coupling the burst signal separator to the phase detector is that it makes it possible to drive the phase detector in a push-pull manner. The push-pull type of operation cancels any undesired second harmonics which may be developed due to a clipping action performed by the burst separator tube.

By using the cathode follower type of oscillator, it is feasible to use a multi-function tube such as the indicated diode-triode of the 6V8 type as a combined oscillator and phase detector. Inasmuch as the oscillator tube 23 has energy developed at its cathode at the color subcarrier wave frequency, this energy may be applied directly to the diode and with the other diode anode also being connected to the cathode of the oscillator tube 23, the common connection of the phase detector circuit is provided. The ease with which any coupling between the burst output transformer 15 and the oscillator coil 27 may be neutralized by means of the capacitor 26 so as to obviate the development of spurious voltages, when the received signals are weak, is another advantage of the system in accordance with the present invention.

As indicated, the reactance tube 21 may be the pentode section of a dual-function tube such as a 6V8. Similarly, the burst signal separator tube 14 may also be the pentode section of a 6U8 type of dual-function tube, as indicated. The triode sections of the burst separator and reactance tubes 14 and 21 respectively may be employed for the performance of other functions in the receiver. Hence, the entire automatic frequency control system requires one complete tube, which in this case, consists of the double diode 18 and the triode 23 serving respectively as phase detector and oscillator tubes, and, in addition, two half tube sections for the burst separator and reactance tubes 14 and 21 respectively, the other sections of which are available for use in the performance of other functions.

The nature of the invention having been indicated in a description of an illustrative embodiment thereof, its scope is pointed out in the appended claims.

What is claimed is:

1. In an automatic frequency controlled oscillator system including a reactance tube, and means for rendering said reactance tube responsive to a control voltage representative of departures of said oscillator from a synchronous relationship with a reference frequency signal, an oscillator tube having a tuned grid circuit and a tuned cathode circuit, said grid circuit including a piezoelectric crystal having an anti-resonant frequency substantially equal to said reference frequency, means providing said reactance tube with an anode circuit tuned to a frequency lower than said reference frequency, said oscillator tube cathode circuit being tuned to a frequency lower than said reference frequency and intermediate said crystal anti-resonant frequency and said reactance tube tuned anode circuit frequency, and means coupling said reactance tube to said oscillator tube grid circuit such that said crystal is effectively in shunt with said reactance tube and is also effectively in shunt with said reactance tube anode circuit.

2. In a crystal controlled oscillator system desirably providing an oscillator output at a predetermined reference frequency, the combination comprising an oscillator tube having a tuned grid circuit and a tuned cathode circuit, said grid circuit comprising a piezo-electric crystal having an anti-resonant frequency equal to a frequency within a narrow band of frequencies encompassing said reference frequency, said cathode circuit being tuned to a frequency lower than said crystal anti-resonant frequency, an additional parallel resonant circuit tuned to a frequency lower than the frequency to which said cathode circuit is tuned, and means for coupling said additional parallel resonant circuit effectively in shunt with said piezo-electric crystal.

3. In combination with an oscillator including an oscillator tube having an anode, a cathode and a control grid, and further including a first tuned circuit coupled between the grid and cathode of the oscillator tube and a second tuned circuit coupled between the anode and cathode of the oscillator tube, a reactance tube arrangement including a reactance tube having a cathode, an anode and a control grid and further including a phase shifting network coupled between the anode and grid of the reactance tube to cause the current through the reactance tube to be in quadrature with the anode voltage thereon, the anode-cathode current path through said reactance tube being interposed between the grid and a connection point intermediate said anode and said second circuit of said oscillator tube.

4. The combination as set forth in claim 3 wherein said first tuned circuit is a crystal.

5. The combination as set forth in claim 3 wherein both the anode and cathode of said oscillator tube are coupled to an alternating current ground connection, one of said anode and cathode being grounded through a high impedance path, the other being grounded through a low impedance path.

6. An oscillator comprising an oscillator section including an oscillator tube having cathode, anode, and control grid electrodes, and a tuned crystal element interconnecting said grid and cathode electrodes; a reactance tube section including a reactance tube device having an anode, a cathode and a control grid, said anode being coupled for alternating voltage to said grid electrode, said cathode being coupled for alternating voltages to said anode electrode, said device further including a phase shifting network coupled between said grid and said anode to shift the discharge current through said device at an angle of substantially 90° with respect to the alternating voltage appearing between said anode and said cathode; and means to supply a control voltage to said grid to shift the oscillator frequency accordingly whereby the coupling between said tube and said element is substantially constant despite said frequency shifts.

References Cited in the file of this patent

UNITED STATES PATENTS

| | | |
|---|---|---|
| 2,058,260 | Reinartz | Oct. 20, 1936 |
| 2,427,231 | Sear | Sept. 9, 1947 |
| 2,438,392 | Gerber | Mar. 23, 1948 |
| 2,594,380 | Barton et al. | Apr. 29, 1952 |
| 2,713,608 | Sonnenfeldt | July 19, 1955 |
| 2,744,155 | Kihn | May 1, 1956 |
| 2,801,282 | Sonnenfeldt | July 30, 1957 |

OTHER REFERENCES

RCA Bulletin entitled "Recent Developments in Color Synchronization in the RCA Color Television System," February 1950.